Nov. 30, 1948.   C. A. BIGELOW   2,455,157
EMERGENCY AIRCRAFT EXIT FOR TRANSPORT AIRCRAFT
Filed March 5, 1947
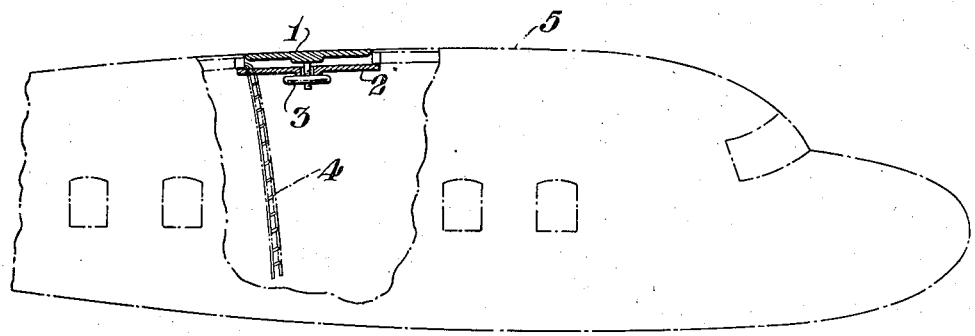
Fig. 1.
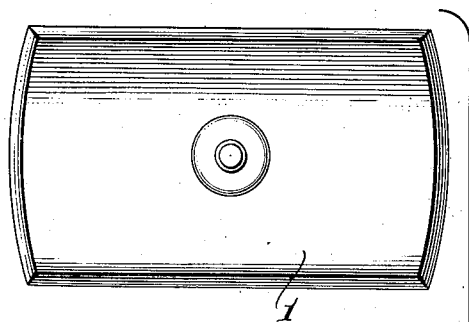
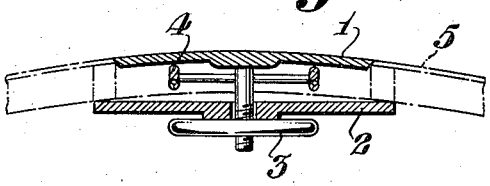
Fig. 3.
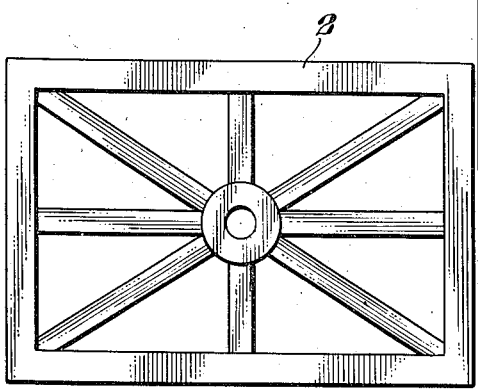
Fig. 2.
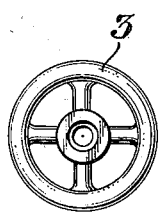
Inventor:
Charles A. Bigelow Patented Nov. 30, 1948

2,455,157

UNITED STATES PATENT OFFICE 2,455,157

EMERGENCY AIRCRAFT EXIT FOR TRANSPORT AIRCRAFT

Charles A. Bigelow, Houston, Tex.

Application March 5, 1947, Serial No. 732,566

1 Claim. (Cl. 244—129)

This invention relates to aircraft and a means of escape for the passengers and crew of a transport aircraft, in the event of a crash landing or forced landing on land or in the water; it being recognized that under the above mentioned circumstances, the regular means of exit could be jammed or rendered unuseable.

With reference to the drawing: Fig. 1 discloses and illustrates the fuselage, in part, of a transport aircraft, in dotted lines; and the invention, which is centrally located in the top portion of the fuselage; said invention comprising four distinct parts; Fig. 2 illustrates an exploded view of parts 1—2—3; Fig. 3 illustrates a cross-section of the parts, in assembled position, as would be the case under normal flight conditions.

Describing the parts individually: 1 top or cover for the opening provided in the fuselage 5, said top 1, fabricated to conform with the contour of the fuselage 5, and having a threaded pipe, centrally located, and substantially attached to the bottom side, thereon, the edges of said top 1, being beveled to fit closely down into like beveled edges of the opening provided for said top 1. 2 a light, but substantial and rigid frame, larger on all sides than the opening; said frame 2, thus having a bearing against the frame of the fuselage 5, adjacent to the opening provided; said frame 2, also has a round opening, centrally located and slightly larger than the threaded pipe, that is attached to the bottom side of top 1, for the said threaded pipe to pass through; 3 illustrates a wheel nut, threaded to fit the threaded pipe, that is attached to top 1; 4 illustrates a rope ladder, one end of which is substantially attached to the frame of fuselage 5, within and at the provided opening; 5 designates the fuselage as shown, in part.

Having thus described the four related parts to the fuselage 5, it will be observed that the top 1 fits closely down into the opening provided, conforming to the smooth contour of fuselage and held secure by the wheel nut 3, which when turned clock-wise, exerts a bearing on the frame 2, said frame 2 is forced to have a bearing against the bottom side of the frame of fuselage 5, adjacent to the provided opening, and thereby the top 1 is held secure and water tight into the opening provided. It will also be understood and recognized that in the process of assembly the rope ladder 4 is folded to lie between top 1 and frame 2.

Now that the process of assembly is complete, it will be recognized, that in the event of an emergency from any cause, wherein the regular means of exit are jammed or made unuseable, a quick turn, counterclockwise, of the wheel nut 3, the wheel nut 3, comes off, allowing the frame 2 to fall off or be taken off and the free end of rope ladder 4 to hang down; going up the ladder 4, the top 1 is pushed up and open, thereby an emergency exit has been made available.

I make no claim for the described parts individually, or their likeness to similar parts, related to their general use, but I claim:

In combination with a transport aircraft, having a fuselage, an emergency exit, centrally located on the top portion of the fuselage; said exit including an opening with bevelled edges in the top of the fuselage and a top fabricated with bevelled edges to fit closely down into said opening, said top having attached to the bottom thereof a centrally-located downwardly extending threaded pipe, a wheel shaped nut carried by the lower portion of said pipe, a frame supported between said nut and the top, and vertically spaced from said top, so as to afford a storage space; a rope ladder secured at one end to the fuselage at the opening thereof and stowable within said storage space, whereby the nut, frame and top may be detached from the fuselage and the rope ladder dropped from its stowed position to afford egress from the fuselage; substantially as described.

CHARLES A. BIGELOW.

REFERENCES CITED

The following references are of record in the file of this patent:

UNITED STATES PATENTS

| Number | Name | Date |
|---|---|---|
| 1,804,156 | Drbul | May 5, 1931 |
| 1,839,808 | Sikorsky | Jan. 5, 1932 |
| 2,312,155 | Flaxman | Feb. 23, 1943 |

FOREIGN PATENTS

| Number | Country | Date |
|---|---|---|
| 15,005 | Great Britain | 1887 |
| 673,256 | Germany | Mar. 20, 1939 |
| 680,562 | Germany | Sept. 1, 1939 |